Patented Feb. 16, 1954

2,669,559

UNITED STATES PATENT OFFICE 2,669,559

ION EXCHANGE PROCESS FOR SEPARATING PROTEINS

Allen F. Reid, Dallas, Tex.

No Drawing. Application July 6, 1951,
Serial No. 235,557

6 Claims. (Cl. 260—112)

This invention relates to control of solubilities by ion-exchange reactions and more particularly to varying salt concentrations in solutions by ion-exchange reactions to control the solubility of the solution. This case is a continuation-in-part of my co-pending application Ser. No. 20,583 filed April 12, 1948 (now abandoned).

It is an object of this invention to adjust the ion concentration in a solution of substances by ion-exchange reactions.

It is a further object of this invention to separate substances from a solution by varying the ion concentration in the solution.

It is more particularly the object of this invention to separate proteins whose solubilities differ from one another in solutions of various salt concentrations by adjusting the ion concentration of the salts in the solutions.

The process of the present invention consists broadly in an exchange of ions between a solution and an ion-exchange resin whereby selected ions are removed from the solution. This removal changing the concentration of the ions in the solution affects the solubilities of the other substances in the solution and the difference in the solubilities is employed to cause a separation of the substances.

Ion-exchange materials are solids which have the capacity of exchanging one ion for another in a solution contiguous to their surfaces. For example, if RH is the acid form of a cation-exchange resin in contact with a solution of sodium chloride:

(1) 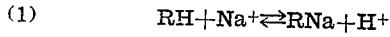 RH+Na+⇌RNa+H+

And if R'OH is the hydroxyl form of an anion-exchange resin in contact with a solution of sodium chloride:

(2) 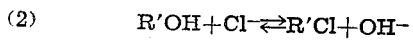 R'OH+Cl-⇌R'Cl+OH-

Many ion-exchange materials are available in granular form suitable for packing in extended beds through which solutions may seep. To follow the application of such a column in adjusting ion concentration, consider the case of a long cation-exchange resin bed which has been equilibrated with a solution 0.1 M to sodium. For simplicity, the effect of hydrogen-ion concentration is neglected. In the top a solution 0.2 M to sodium is poured. The reaction (1) is displaced to the right with absorption by the resin of sodium ion and release to the solution of hydrogen ion in the attempt to restore equilibrium. The sodium concentration of the solution is reduced at the top of the column. This sodium depleted solution progresses further down the bed, its sodium concentration approaching nearer and nearer to 0.1 M until it exits at that concentration. More and more solution can be put through and have its concentration adjusted to 0.1 M until such time as the bed capacity for sodium under the operating conditions has become saturated far enough down so that the remaining layers of resin are not able to remove all of the excess sodium. A similar situation exists if the concentration of sodium in the solution introduced had been less than 0.1 M—sodium from the resin going into the solution to make up the difference.

Similarly, an anion-exchange resin bed could adjust the concentration of any anions in a solution progressing through it. Thus with a mixture of the two types of ion-exchangers, a solution can be adjusted to concentrations of ions compatible with the capacity of the exchangers, if, prior to passage of that solution, the bed has been conditioned to be in equilibrium with the ion concentration desired.

Many natural proteins are soluble in aqueous solutions of common chemical compounds and are ofttimes found in mixtures in the same solutions from which one or several of them is desired to be removed. As an example, we may consider the fractions of human blood plasma. These include proteins known as albumins which are soluble in distilled water, and various types of globulins which are not soluble in distilled water but are soluble in various concentrations of solutions of sodium chloride. When human blood serum is separated from the blood cells and fibrin, it contains these proteins in solutions which have a salt concentration of approximately 0.17 mole per liter. The globulins present can be precipitated and the albumin left in the solutions if most of the salts are removed from this serum. Such fractionation is valuable because the separated albumin fractions can be used medicinally for the treatment of shock, etc. and the separated globulin contains several fractions which are medicinally useful as immune sera and in the treatment of hemophilic cases, etc. Because of the different solubilities of these components, it is evident that fractionation can be attained by adjusting the concentration of the non-protein constituents of the solutions. Up to the present time no practical method has been advanced for adjusting those concentrations for that purpose which was satisfactory from the standpoints of expense and the protection of the chemically and thermally sensitive products. In order to adjust the concentration of these chemical constituents, I have introduced the solution at conservative temperatures to beds of ion-exchange resins which have been conditioned so that they will absorb ions in the proper amounts and proportions to leave a concentration of ions in the solutions favorable for such fractionation.

The introduction of such an improved method for this fractionation is important since present methods, as well as being quite expensive, involve processes such as the use of very cold alcohol which decreases the potency and desirability of some of the products.

The following is a procedure which may be followed in one application of the principle of this invention:

A mixture of a cation-exchange resin and an anion-exchange resin is washed thoroughly with distilled water to reduce the salt concentration. This mixture of resins is placed in a series of columns and washed again. The solution of proteins to be separated, such as defibrinated blood plasma, is poured through these prepared columns. At the end of this treatment the ions which are taken by the resins in the ion-exchange reactions are removed from the solution. The removal of these ions by changing the ion concentration of the solution changes the solubility of one or more of the proteins in the solution with relation to the other proteins and consequently causes precipitation. The different proteins are precipitated at different points in the process as their solubilities are different in the various ion concentrations.

Applying this to human blood plasma, by removing salt from the plasma, the globulins are rendered insoluble in the solution and precipitated, leaving the albumin which is soluble in distilled water. The precipitated globulins may be centrifuged off from the treated solution and those which remain trapped in the columns dissolve out with a saline solution. The final solution which has passed through all the beds contains no appreciable globulins after centrifugation. Albumin which is left in the precipitated globulin fractions may be dissolved out with distilled water without dissolving the globulins. The globulin fractions which have been washed out of the columns with the saline solution may contain some albumin because of the hold-up of liquid in the columns under normal operation.

The globulin fractions are separated from each other by a process of preferential leaching and precipitation. The mixture is first washed free of albumin and then leached with solutions of sodium chloride at a controlled pH. Under these conditions one globulin sub-fraction is dissolved preferentially from the others. The salt concentration and the pH of the leaching solution is then adjusted with an ion-exchange resin mixture and a selective precipitation of globulins is obtained. This globulin precipitate is subjected to another selective leaching followed by a selective precipitation. In this way, using proper control of the pH, the sodium chloride concentration and the concentration of other salts, it is possible to fractionate the globulins to any degree of refinement. In the described separation of globulin and albumin in blood plasma the mixture of two types of resins used is intended to keep the pH of the blood plasma solution neutral between alkalinity and acidity. This is achieved by having the cation-exchange resin remove the sodium ion in this separation replacing it with hydrogen ion and the anion-exchange resin removing the chloride ion replacing it with a hydroxyl ion. The subsequent neutralization of the hydroxyl ions with the excess hydrogen ions and vice versa insures that no high concentration of acid is present in the solution. This is important as an acid pH would cause precipitation of the albumin and possibly denaturation of the proteins, and a basic pH would denature the proteins. The other blood serum salts are removed similarly. In the passage of the solutions through the ion-exchange resins some of the anion-exchange resin may be dissolved and taken into the solution. Pyrogens which are contaminants formed by bacteria may be present in the reconstituted plasma and could be present in the distilled water which is used in the operations. Any bacterial matter which might also be present could form other pyrogens unless the operations were carried out at an elevated temperature which would be objectionable as causing denaturation of the proteins. Therefore, to remove these impurities and contaminants from the solution it is passed through two final beds containing only the cation-exchange resin. These beds are conditioned first with distilled water and finally with pyrogen-free water and thus are able to take up the aforementioned contaminants. Finally, the solution is sent through a bacterial filter to effectively remove any small particles of resin or bacteria which might have been picked up. This is removed by reprocessing. The albumin in the solution after concentration is safe for intravenous use.

The following example will serve to illustrate this process:

I. A mixture of four parts of Amberlite IR-100 H, a cation-exchange resin, furnished by the Resinous Products Chemical Company of Philadelphia, and 9 parts of Permutit Deacidite, an anion-exchange resin, furnished by the Permutit Company of New York city, was washed thoroughly with distilled water until the salt concentration was less than four parts per million. This mixture of resins was put in a series of 5 columns, each about 2 inches in diameter and 4 feet in length, and washed again. 1500 cc. of double strength reconstituted defibrinated blood plasma were poured consecutively through these columns. At the end of this treatment, the total salt to albumin ratio was less than 1 to 1000 in the albumin solution. Amberlite IR-100 H is a phenol-formaldehyde resin with a polyhydric phenol base and cationically active —$SO_3H$ groups. Deacidite is a highly basic aliphatic amine type anion exchange resin. Amberlite IR-4 B is an amine type resinous anion exchanger containing approximately 14% nitrogen in the hydroxyl form.

A further application of the process of this invention is shown in removing hemoglobin from samples of blood serum. In samples of blood serum a certain amount of hemoglobin which is released by the fracture of red blood cells is present and soluble in salt-free solutions. It is desirable to remove the hemoglobin, a highly colored impurity, from the albumin fractions. Hemoglobin dissociates in a solution of sodium salicylate at values of pH which will not precipitate albumin. By adjusting the concentration of sodium salicylate and acid ion to cause dissociation of the hemoglobin and then removing the iron-containing ion salts, the sodium salicylate and acid with a mixture of cation and anion-exchange resins, the hemoglobin is prevented from reassociating and its objectionable nature is eliminated.

The following example serves to illustrate this process:

II. A solution of blood serum albumin was made 0.1 molar to sodium salicylate and then acidified to a pH of about 5.5. This dissociated the hemoglobin in the blood serum solution. The treated solution was then passed in contact with a mixture of 9 parts Deacidite and 4 parts Amberlite IR 100 H. The hemoglobin was reduced in the solution by a factor of more than 100 to less than 3 parts hemoglobin per 10,000 parts of albumin.

Another application of this invention is the separation of some of the proteins in milk. Here a sample of concentrated milk whey containing lactoalbumin and lactoglobulin may be passed through a washed mixture of 70% Zeocarb H, an organic cation-exchange resin of the coal derivative type, furnished by the Permutit Company and 30% Amberlite IR 4B, an amine type resinous anion exchanger containing approximately 14% nitrogen in the hydroxyl form, furnished by the Resinous Products Chemical Company. The salt-free solution contains primarily lactoalbumin, globulins being precipitated out as the salt concentration goes down.

Another example is in the separation of the globulins from the albumin in bovine serum. This is important as bovine albumin is routinely used in the medical sciences as a diagnostic aid. This separation may be accomplished by using either a mixture of four parts of Amberlite IR 100, a phenol-formaldehyde resin with a polyhydric phenol base and cationically active-$SO_3H$ groups, and nine parts of Permutit Deacidite, a highly basic aliphatic amine type anion-exchange resin; or by using a mixture of one part of Amberlite IR 100 and two parts of Amberlite IRA 400, a strongly basic anion-exchange resin with a high stability. When the concentration of the salts has been brought down to an ionic strength of .015 by treating the solution with a resin mixture, most of the globulins precipitate out leaving a solution which may be satisfactorily purified by a subsequent heat treatment.

Another application of the invention is the separation of proteins produced by the action of bacteria on culture media. These protein products may be used, when modified somewhat chemically, as antigens to produce immunity in the body because of their stimulation of the production of antibodies. An example of this is diphtheria toxoid. In the production of this toxoid, *Corynebacterium diphtheriae* is allowed to grow in a culture medium. The toxicity of the resulting protein is destroyed by treatment with formaldehyde or some other modifying means while still preserving the antigenicity of the material. This detoxified protein must then be freed from other colloids present in order to make a preparation which is satisfactorily active and safe for injection. It is found that after the gross impurities have been separated from the toxoid, it may be further purified by subjecting its solution to a mixture of two parts Amberlite IRA 400 to one part Amberlite IR 100, thus reducing the salt concentration to below an ionic strength of .001 while keeping the pH value between 6.5 and 7.5. This treatment causes precipitation of contaminating colloid material which may then be mechanically separated from the rest of the proteins. The resulting protein may be even further separated by adjusting the pH with Amberlite IR 100 to a value of 3.5 where an electrophoretically pure component is precipitated out. This may then be separated from the rest of the solution by mechanical separation. A type of antigen may be produced by subjecting certain bacteria to other influences. One such method is to subject bacteria to ultrasonic vibrations. However, more than one type of antigen may be produced by such treatment. For certain medical reasons it is often advisable to separate these. Another application of the invention is the separation of such substances. As an example of this, a colloidal suspension of the antigens from the sonic disruption of *Staphylococcus aureus* with an ionic strength of 0.10 and a pH of 7 was treated with one-third its volume of a mixture of one part of the cation-exchange resin Amberlite IR 120 and two parts of the anion exchange resin Amberlite IRA 400 for five minutes. This reduced the solution to an ionic strength of 0.001 and caused the precipitation of one protein fraction leaving another protein fraction in solution. In the treatment the pH was kept in the range from 6–7 avoiding alkali or acid denaturation of the proteins. The precipitated fraction was redissolved in a solution of ionic strength 0.20 and the two portions contained the biologically different types of antigen.

As another modification of the procedure of the application of this invention, the reduction of the salt concentration of the solution of diphtheria toxoid may be accomplished by first subjecting the solution to a small amount of Amberlite IRA 400, not allowing the pH to rise above 8, then transferring the solution to a small amount of Amberlite IR 100, not allowing the pH to go below 6, then transferring the solution to another batch of IRA 400, then to another batch of IR 100 and so on, always keeping the pH between the limits of 6 and 8 until the ionic strength has been reduced to .001. This treatment causes precipitation of contaminating colloid material as in the example above.

A similar application of the invention exists in the purification of tetanus toxoid. After production in a similar manner by the action of *Clostridium tetani* on a nutrient medium and gross separation of the protein, the toxoid containing fraction may be purified from other protein colloids by removal of the salts to an ionic strength of 0.001, keeping the pH value between 6.5 and 7.5 using a mixture of two parts of Amberlite IRA 400 to one part Amberlite IR 100. The precipitated impurities may be removed by mechanical separation. The remaining solution may be further separated by reducing the pH with Amberlite IR 100 to 5.0, at which time an electrophoretically discrete protein component will precipitate out. This may be removed by mechanical separation.

As another modification of the procedure of the application of this invention, the reduction of the salt concentration of the solution of tetanus toxoid may be accomplished by first subjecting the solution to a small amount of Amberlite IR 100, not allowing the pH to go below 6, then transferring the solution to a small amount of Amberlite IRA 400, not allowing the pH to rise above 8, then transferring the solution to another batch of IR 100, then to another batch of IRA 400 and so on, always keeping the pH between the limits of 6 and 8 until the ionic strength has been reduced to .001. This treatment causes precipitation of contaminating colloid material as in the example above.

Two important by-products of the meat packing industry are the enzymes pepsin and rennin. They occur in the gastric secretions of such animals as cattle and hogs and are recovered from these sources. In the state in which they are recovered in the crude secretions they are not practical for commercial sale or usage. It is therefore necessary to purify them. A further application of this invention may be utilized in this purification. It is found that by using a mixture of about one part Amberlite IRA 400 to one part Amberlite IR 100 for the removal of salts and acid to an ionic strength of .001 and a pH of 3, many of the protein impurities are precipitated out from a pepsin solution. These may be removed by mechanical separation. On further treatment of the pepsin solution with Amberlite IRA 400 to bring the pH to 3.52, very concentrated pepsin will precipitate out. The mixture of Amberlites IRA 400 and IR 100 serves to keep the pH low enough so that the pepsin, which is unstable at a high pH, is not denatured.

As another modification of the procedure of the application of this invention, the reduction of the salt concentration of the solution of pepsin may be accomplished by first subjecting the solution to a small amount of Amberlite IR 100, not allowing the pH to go below 1, then transferring the solution to a small amount of Amberlite IRA 400, not allowing the pH to rise above 3, then transferring the solution to another batch of IR 100, then to another batch of IRA 400 and so on, always keeping the pH between the limits of 1 and 3 until the ionic strength has been reduced to 0.001. The solution is finally treated with Amberlite IRA 400 to bring the pH to 3.52. This treatment causes precipitation of concentrated pepsin as in the example above.

In a similar application of the invention, if a crude rennin solution at a neutral pH is treated with a mixture of two parts Amberlite IRA 400 and one part Amberlite IR 100, the salt concentration may be brought to an ionic strength of .001 keeping the pH between 6.0 and 7.5. Many contaminating proteins are precipitated upon such treatment and may be removed by mechanical separation. Upon reduction of the pH to 3.75 by treatment with Amberlite IR 100, a concentrated rennin is precipitated.

As another modification of the procedure of the application of this invention, the reduction of the salt concentration of the solution of rennin may be accomplished by first subjecting the solution to a small amount of Amberlite IR 100, not allowing the pH to go below 5, then transferring the solution to a small amount of Amberlite IRA 400, not allowing the pH to rise above 8, then transferring the solution to another batch of IR 100, then to another batch of IRA 400 and so on, always keeping the pH between the limits of 5 to 8 until the ionic strength has been reduced to .001. Finally the solution is brought to a pH of 3.75 by treatment with Amberlite IR 100. This treatment causes precipitation of contaminating colloid material as in the example above.

In the above described preparations, the enzymes retained their original activity. In other methods of removal or separation, such as the precipitation by salting-out with a high concentration of sodium sulphate, these enzymes may be denatured.

Many natural proteins are of vegetable origin and are quite important in the economic life of today, particularly in the food industry. For example, it is found that the type of proteins found in ordinary wheat flour are very important in the use of this flour for the manufacture of products such as bread, cake, etc. Attempts to modify the concentrations of the proteins in flour so as to be able to market it for certain uses have been defeated by the failure to separate out some fractions from other protein constituents by a practical means. An application of this invention to this separation is to solubilize a portion of the wheat proteins in a salt solution and then to precipitate out certain proteins by removal of the salts using ion exchange resins. In a specific instance some common wheat flour was mixed with a solution of salt with an ionic strength of approximately 0.15. The resulting solution of wheat proteins was mechanically separated from the remaining solid material and subjected to a mixture of two parts Amberlite IRA 400 and one part of Amberlite IR 100. As the salt concentration decreased with the pH remaining between 6.5 and 7.5, wheat proteins fractionally precipitated out. These could be mechanically separated from the solution.

Other natural vegetable proteins of considerable food value are found in peanuts. After the oil was removed from some crushed peanuts, some of the proteins were dissolved in a salt solution of an ionic strength of approximately 0.60. These were then fractionally precipitated by reducing the salt concentration to an ionic strength of less than .01 using a mixture of two parts of Amberlite IRA 400 to one part of Amberlite IR 100 thus keeping the pH at a value of 6.5 to 7.

Certain vegetable proteins have enzymatic activity. One of the most important of these is urease which is made from jackbeans. After this protein has been separated grossly from the inactive material according to the most advanced means in common practice, the enzyme is still contaminated with much protein which serves not only to dilute its activity but also actually to inhibit some of the enzyme action. If some of this grossly purified urease is placed in a solution of salt with an ionic strength of .02 and then subjected to a mixture of two parts of Amberlite IRA 400 to one part of Amberlite IR 100 and the salt concentration is brought to an ionic strength of .001 with the pH remaining between 6.5 and 7.5, the urease will be precipitated in a much purer form and its total activity when used will be increased by several hundred percent.

Another important vegetable enzyme is papain. Here again, the conventionally purified papain preparation is a mixture of several proteins. These can be separated from each other by putting them into solution in a salt solution of an ionic strength of 0.02. As the salt concentration is decreased to an ionic strength of 0.001 while keeping the pH between 7.5 and 8 by treating the solution with a mixture of one part of Amberlite IR 100 to 3 parts of Amberlite IRA 400, contaminating impurities precipitate out leaving a purer preparation of papain.

Still another application of the method of this invention is a resin artificial kidney. The kidney normally serves to remove waste products such as urea, etc. from the blood stream. If its functioning is impaired too much, even temporarily, the animal dies. However, by conditioning a bed containing a mixture of 9 parts Amberlite IR 100 H and one part Deacidite with a solution of approximately the same ionic concentrations as normal blood serum, and then passing blood from dogs with their kidneys removed through the bed and back into the dogs it was possible to reproduce the purifying effect of the normal kidneys. A refinement included addition of a small bed of Amberlite IR 100 H at the exit end of the large bed to absorb the small amounts of dissolved Deacidite. The purified blood showed no detectable deleterious effects.

It can also be seen that the same process can be used in individual operations for direct application. Globin was prepared from hemoglobin by treating an aqueous hemoglobin solution with sodium salicylate and hydrochloric acid and then a resin mixture as above described. Pyrogens were removed from old distilled water by passing the water through a resin bed that had previously been washed with pyrogen-free water.

Although only Amberlite IR 100 H, Amberlite IR 4B, Zeocarb H and Deacidite have been used to illustrate the application of the process of the present invention to the removal of ions from a protein solution, other ion-exchange resins may be used successfully in the present process.

The collective singular of a heterogeneous substance such as "globulin," "protein" or "albumin" conventionally also covers the plural in accordance with established usage.

Protein separation processes adjusting the pH to values outside of the neutral zone disclosed and not claimed herein are disclosed and claimed in applicant's later filed application Ser. No. 392,507.

I claim:

1. In a process of separating a protein from other proteins in an aqueous solution containing a plurality of proteins as solutes and also having a salt content present as cations and anions in a concentration rendering said first-mentioned protein soluble in said solution and in the absence of which cations and anions said protein is insoluble in said solution, another protein solute of said solution being soluble therein in the absence of said cations and anions in said concentration, the steps of providing a mixture of cation-exchange and anion-exchange resins conditioned to be in equilibrium with an ion concentration at which said solution-contained cations and anions are removed from said solution, passing said aqueous solution of said proteins and salt solute in contact with said cation-exchange resin and said anion-exchange resin adjusting the pH of the solution to substantially neutral in the range 6 to 8 between alkalinity and acidity by ion-exchange between said solution and said resins, removing from said solution said solubilizing cations by ion exchange with said cation-exchange resin to reduce said solubilizing cations and removing from said solution said solubilizing anions by ion exchange with said anion-exchange resin to reduce said solubilizing anions, and thereby precipitating said first-mentioned protein from said solution of said proteins, and separating said precipitate from said solution.

2. A process of separating a protein from other proteins in an aqueous solution as set forth in claim 1 in which the aqueous solution is selected from the group consisting of human blood plasma, human blood serum, milk, bovine blood serum, a solution of diphtheria toxoid, a colloidal suspension of antigens, a solution of tetanus toxoid, a crude rennin solution, a solution of wheat proteins, a solution of peanut proteins, a solution of urease, and a solution of papain.

3. In a process for the separation of certain proteins from other proteins in a blood solution selected from the group consisting of blood plasma and blood serum and aqueous solutions of natural blood proteins and containing an adequate concentration of the natural anion and cation solubilizing ions, the said certain proteins being solubilized by said ions in the blood solution and the other said proteins being both soluble in the blood solution and in the absence of said concentration of said solubilizing ions, the steps of providing an anion exchange resin and a cation exchange resin which are capable of removing said solubilizing ions from said blood solution, passing said solution in contact with said anion exchange resin and said cation exchange resin, adjusting the pH of said blood solution to neutral by ion exchange with said anion exchange resin and said cation exchange resin, removing from a portion of said solution both said anion solubilizing ions and said cation solubilizing ions from said blood solution by ion exchange with said anion exchange resin and said cation exchange resin to provide a reduction of both said anion and cation solubilizing ions in said portion thereby precipitating therefrom said certain proteins in the blood solution and then separating the precipitated porteins from said solution retaining the said other proteins.

4. In a process for the separation of globulins from other proteins in an ion-containing natural blood solution selected from the group consisting of blood plasma and blood serum and aqueous solutions of natural blood proteins in which said globulins and other proteins are soluble, said globulins being insoluble in the absence of an adequate concentration of said ions, the steps of providing an anion exchange resin and a cation exchange resin which are capable of removing said solubilizing ions from said blood solution, passing said blood solution with both said globulins and other proteins in contact with said anion exchange resin and said cation exchange resin, adjusting the pH of said blood solution to neutral by ion exchange between said solution and said resins, removing from said solution said anion solubilizing ions by ion exchange with said anion exchange resin to provide a reduction of said anion solubilizing ions in said solution, removing cation solubilizing ions from said solution by ion exchange with said cation exchange resin to provide a reduction of cation solubilizing ions in said solution thereby precipitating the globulins from the solution of said other proteins and then separating out the precipitated globulins.

5. A process of separating a protein from other proteins as set forth in claim 1 in which the separated protein is a fraction containing a group of proteins and further separation is effected within this group by preferential precipitation of a desired fraction from a solution containing said group.

6. A process for the separation of certain proteins from other proteins in a blood solution selected from the group consisting of blood plasma and blood serum and aqueous solutions of natural blood proteins as set forth in claim 3 in which said certain proteins are separated as a group and subjected to further separation by preferential precipitation of a desired fraction from a solution containing said group.

ALLEN F. REID.

(References on following page)

References Cited in the file of this patent

UNITED STATES PATENTS

| Number | Name | Date |
|---|---|---|
| 2,240,116 | Holmes | Apr. 29, 1941 |
| 2,275,210 | Urbain et al. | Mar. 3, 1942 |
| 2,461,505 | Daniel | Feb. 15, 1949 |

OTHER REFERENCES

Ser. No. 359,575, Smit (A. P. C.), published May 11, 1943, 5 pages.

Steinberg, Proc. Soc. Exptl. Biol. and Med. (June 1944), pp. 124-127.

Myers et al., Ind. and Eng. Chem. (May 1941), vol. 43, pp. 697-706.

Cohn et al., J. Am. Chem. Soc., Mar. 1946, vol. 68, pp. 459-475.